(12) United States Patent
Maeda et al.

(10) Patent No.: US 11,750,768 B2
(45) Date of Patent: *Sep. 5, 2023

(54) DISPLAY CONTROL APPARATUS

(71) Applicant: DENSO CORPORATION, Kariya (JP)

(72) Inventors: Yu Maeda, Nisshin (JP); Taketo Harada, Nisshin (JP); Mitsuyasu Matsuura, Nisshin (JP); Hirohiko Yanagawa, Kariya (JP); Muneaki Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,662

(22) Filed: Jun. 14, 2021

(65) Prior Publication Data

US 2021/0306590 A1 Sep. 30, 2021

Related U.S. Application Data

(63) Continuation of application No. 16/096,042, filed as application No. PCT/JP2017/016367 on Apr. 25, 2017, now Pat. No. 11,064,151.

(30) Foreign Application Priority Data

Apr. 26, 2016 (JP) ................. 2016-088183

(51) Int. Cl.
*B60R 1/00* (2022.01)
*G06T 1/00* (2006.01)
(Continued)

(52) U.S. Cl.
CPC ........... *H04N 5/44504* (2013.01); *B60R 1/00* (2013.01); *G06T 1/00* (2013.01); *G06T 7/13* (2017.01);
(Continued)

(58) Field of Classification Search
CPC .. H04N 5/44504; H04N 5/2628; H04N 5/272; H04N 7/18; B60R 1/00;
(Continued)

(56) References Cited

U.S. PATENT DOCUMENTS

2002/0149673 A1* 10/2002 Hirama .................... B60R 1/00
                                                 348/E7.087
2007/0053551 A1    3/2007 Kubo et al.
(Continued)

FOREIGN PATENT DOCUMENTS

JP    2000-142284 A    5/2000
JP    2007-295043 A    11/2007
(Continued)

*Primary Examiner* — Robert J Hance
(74) *Attorney, Agent, or Firm* — MASCHOFF BRENNAN

(57) ABSTRACT

An image processing unit identifies the shape of an obstacle that is identified from an area that appears in a peripheral image based on an image captured by a camera. The shape of the obstacle includes at least a tilt of a section of the obstacle in a road-surface direction. The section of the obstacle faces a vehicle. The image processing unit generates a superimposed image in which a mark image that is generated as a pattern that indicates the identified obstacle is superimposed onto a position that corresponds to the obstacle in the peripheral image. At this time, the image processing unit variably changes properties of the mark image based on the tilt of the obstacle identified by an obstacle identifying unit. The image processing unit then displays the generated superimposed image on display apparatus.

2 Claims, 14 Drawing Sheets

(51) Int. Cl.
*G06V 20/58* (2022.01)
*H04N 5/445* (2011.01)
*H04N 7/18* (2006.01)
*G06T 7/13* (2017.01)
*H04N 5/262* (2006.01)
*H04N 5/272* (2006.01)

(52) U.S. Cl.
CPC .......... *G06V 20/58* (2022.01); *H04N 5/2628* (2013.01); *H04N 5/272* (2013.01); *H04N 7/18* (2013.01); *B60R 2300/304* (2013.01); *G06T 2207/30261* (2013.01); *G06V 2201/08* (2022.01)

(58) Field of Classification Search
CPC ....... B60R 2300/304; G06T 1/00; G06T 7/13; G06T 2207/30261; G06V 20/58; G06V 2201/08
See application file for complete search history.

(56) References Cited

U.S. PATENT DOCUMENTS

| | | | |
|---|---|---|---|
| 2007/0106475 A1* | 5/2007 | Kondoh | G06V 20/58 340/436 |
| 2008/0205706 A1 | 8/2008 | Hongo | |
| 2010/0220189 A1 | 9/2010 | Yanagi | |
| 2012/0300075 A1 | 11/2012 | Yamamoto et al. | |
| 2012/0320211 A1* | 12/2012 | Mitsugi | G06T 3/00 348/148 |
| 2014/0085476 A1 | 3/2014 | Toyofuku | |
| 2014/0118551 A1 | 5/2014 | Ikeda et al. | |
| 2014/0133700 A1* | 5/2014 | Seki | G06V 20/586 382/103 |
| 2014/0176350 A1 | 6/2014 | Niehsen et al. | |
| 2014/0247352 A1 | 9/2014 | Rathi et al. | |
| 2015/0203036 A1 | 7/2015 | Kajiwara | |
| 2015/0269450 A1* | 9/2015 | Tasaki | G06V 20/58 348/148 |
| 2016/0155242 A1* | 6/2016 | Bean | G06T 15/503 345/592 |
| 2016/0297430 A1* | 10/2016 | Jones | B60W 30/0956 |
| 2017/0144584 A1 | 5/2017 | Asaoka | |
| 2018/0032823 A1 | 2/2018 | Ohizumi | |
| 2018/0134217 A1 | 5/2018 | Peterson et al. | |
| 2018/0237069 A1* | 8/2018 | Gehin | B62D 15/0285 |
| 2019/0132543 A1 | 5/2019 | Maeda et al. | |

FOREIGN PATENT DOCUMENTS

| | | |
|---|---|---|
| JP | 2011070593 A * | 4/2011 |
| JP | WO2011145141 A1 | 7/2013 |
| JP | 2016-052867 A | 4/2016 |
| WO | 2004083889 A1 | 9/2004 |
| WO | 2010070920 A1 | 6/2010 |
| WO | 2011058822 A1 | 5/2011 |
| WO | 2012076789 A1 | 6/2012 |

* cited by examiner

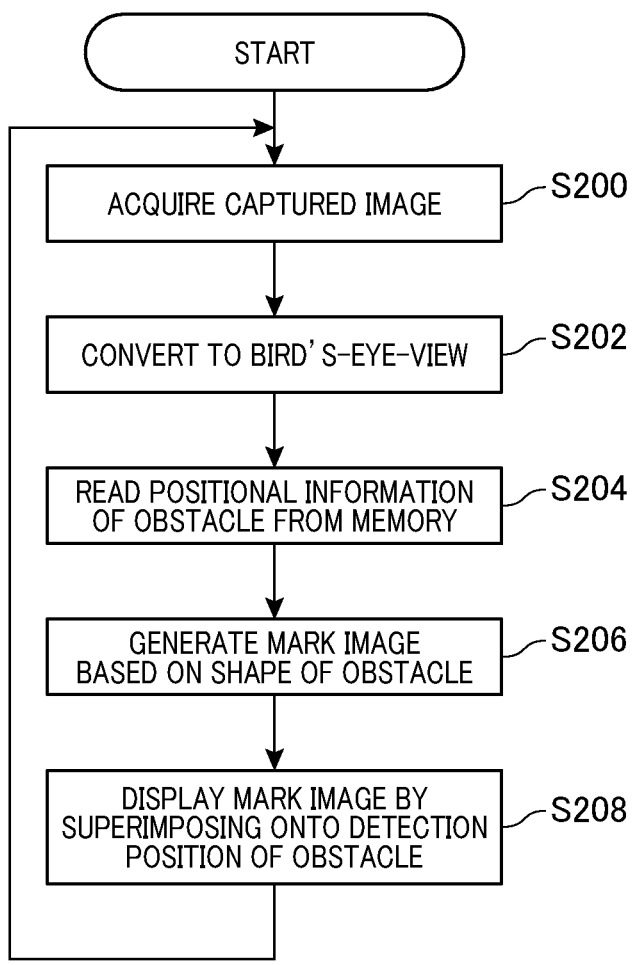

FIG.6A
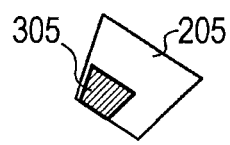
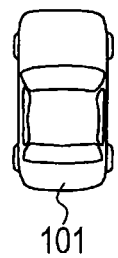
FIG.6B
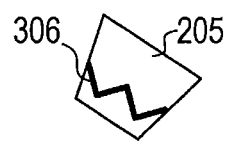
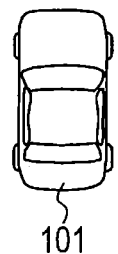
FIG.6C
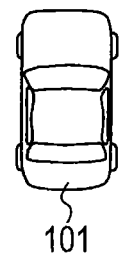
FIG.6D
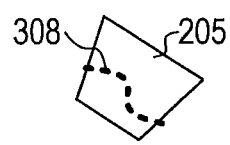
FIG.6E
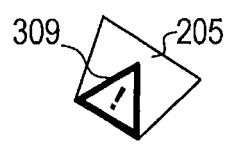
FIG.6F
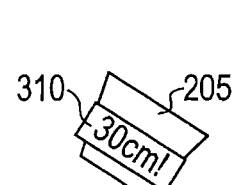
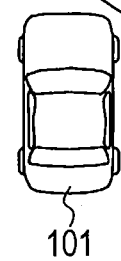

FIG.9
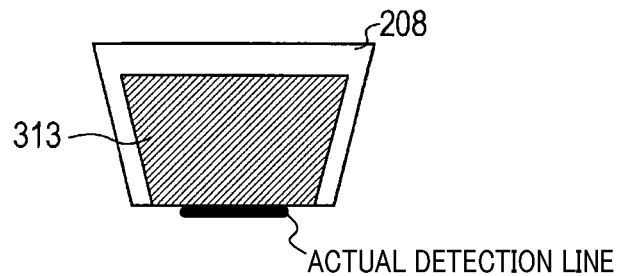
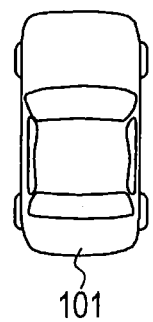
FIG.10A
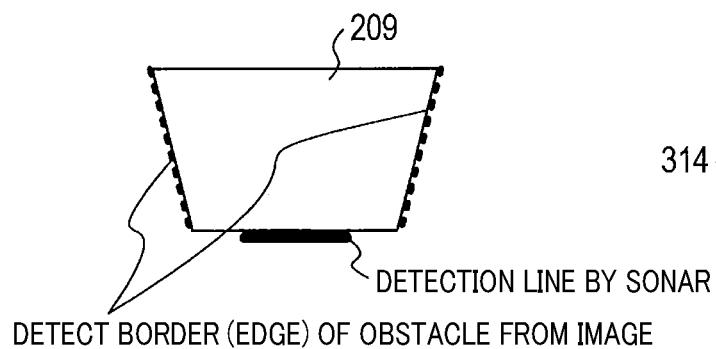
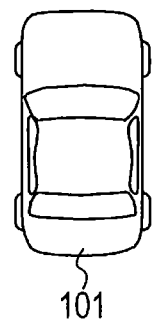
FIG.10B
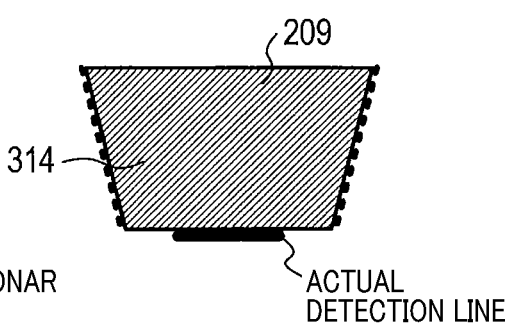
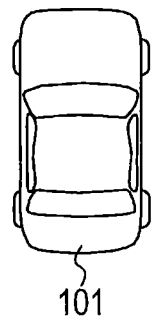

FIG.13
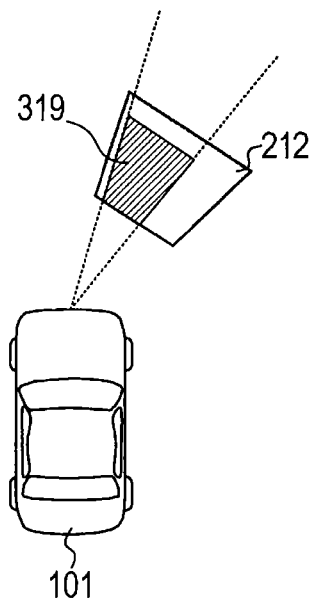
FIG.14A
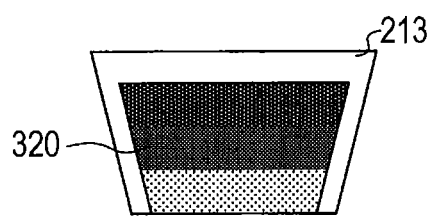
FIG.14B
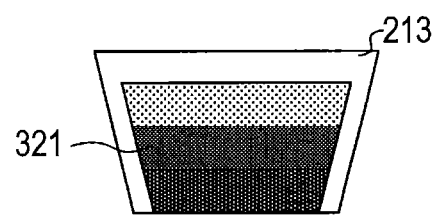
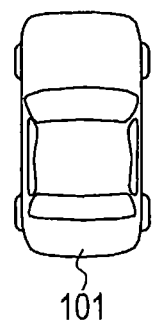
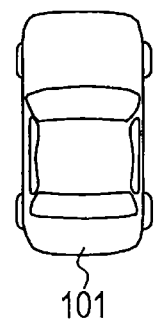

FIG.15A
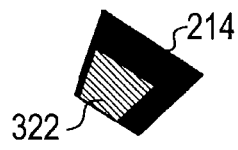
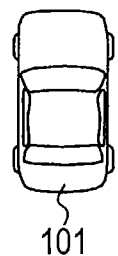
FIG.15B
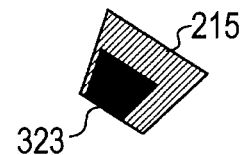
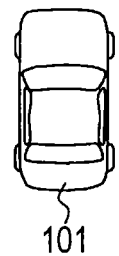
FIG.16
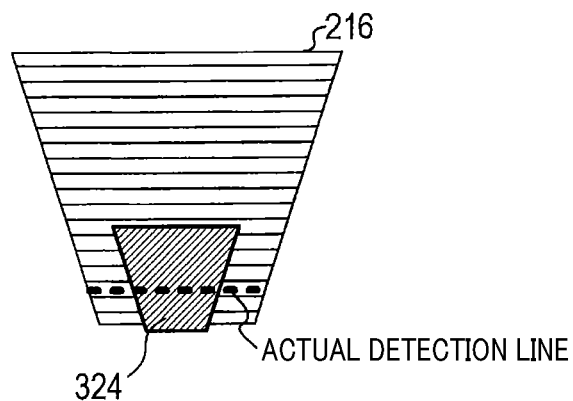
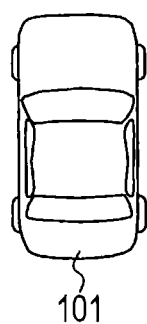

FIG.17
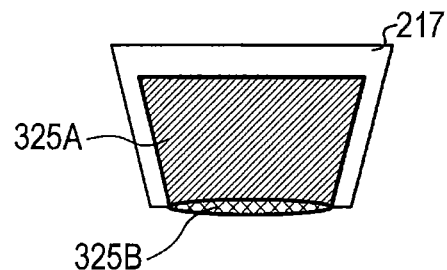
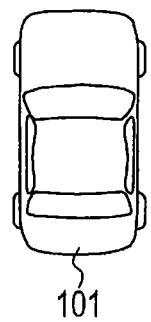

ACTUAL DETECTION LINE

DISPLAY CONTROL APPARATUS

CROSS-REFERENCE TO RELATED APPLICATIONS

The present application is a continuation application of U.S. application Ser. No. 16/096,042, filed on Oct. 24, 2018, which is based on and claims the benefit of priority from Japanese Patent Application No. 2016-088183, filed on Apr. 26, 2016, the descriptions of which are incorporated herein by reference.

TECHNICAL FIELD

The present disclosure relates to a display control apparatus that displays an image on a display apparatus that is provided inside a vehicle, the image being captured by a camera that is mounted in the vehicle.

BACKGROUND

A technology in which a camera that is mounted in a vehicle captures an image of a predetermined area in the periphery of the vehicle and the captured image that has been captured is displayed on a display apparatus, such as a display, that is provided inside the vehicle is known.

In such a technology, an obstacle detection display technology in which information indicating an obstacle that is present in the captured image is displayed together with the captured image is known. For example, PTL 1 discloses a technology in which, in addition to an image of a vehicle rear portion being displayed in a display apparatus, a pattern that indicates the direction and distance of an obstacle detected by a rear sonar is displayed.

CITATION LIST

Patent Literature

[PTL 1] JP-A-2000-142284

SUMMARY

In the technology described in PTL 1, a driver can know the approximate direction of the obstacle and the distance to the obstacle by the position and color of the pattern that is displayed together with the captured image. However, as a result of detailed examination by the inventors, a following issue has been discovered. That is, information such as the position and color of the pattern alone is insufficient for ascertainment of specific properties including the shape and orientation of the obstacle.

According to an aspect of the present disclosure, it is desired to provide a technology for displaying information that enables a driver to easily ascertain properties including the shape and tilt of an obstacle that is present in an imaging area in the periphery of a vehicle.

A display control apparatus according to an aspect of the present disclosure is configured to display an image in a display apparatus that is provided inside a vehicle, the image being generated based on an image capturing a predetermined area in a periphery of the vehicle by a camera that is mounted in the vehicle. The display control apparatus includes an image acquiring unit, an obstacle identifying unit, and a control unit. Reference numbers within the parentheses in the claims indicate corresponding relationships with specific means described according to an embodiment, described hereafter as an aspect, and do not limit the technical scope of the present disclosure.

The image acquiring unit is configured to acquire a peripheral image that is an image based on the image captured by the camera. The peripheral image is an image that directly shows the image captured by the camera or an image that is obtained through coordinate transformation of the image captured by the camera to an image viewed from another perspective (such as a bird's-eye-view image). The obstacle identifying unit is configured to identify a shape of an obstacle that is identified from an area appearing in the peripheral image acquired by the image acquiring unit, the shape of the obstacle including at least a tilt of a section of the obstacle in a road-surface direction, the section of the obstacle facing the vehicle.

The control unit is configured to generate a superimposed image in which a mark image that is generated as a pattern that indicates the obstacle identified by the obstacle identifying unit is superimposed onto a positon corresponding to the obstacle in the peripheral image, and display the generated superimposed image in the display apparatus. Furthermore, the control unit is configured to variably change properties of the mark image based on the tilt of the obstacle identified by the obstacle identifying unit.

As a result of the display control apparatus configured as described above, the properties of the mark image that is the pattern that indicates an obstacle can be freely changed based on the shape including at least the tilt of the obstacle. In addition, as a result of a driver of the vehicle viewing the mark image that is superimposed onto the peripheral image, the driver can easily ascertain the shape and tilt of the obstacle.

BRIEF DESCRIPTION OF DRAWINGS

The above-described object, other objects, characteristics, and advantages of the present disclosure will be further clarified through the detailed description hereafter, with reference to the accompanying drawings. An overview of the drawings is as follows:

FIG. 3 is a flowchart of the steps in an obstacle display process;

FIG. 6A is a diagram of a variation of a mark image;
FIG. 6B is a diagram of a variation of the mark image;
FIG. 6C is a diagram of a variation of the mark image;
FIG. 6D is a diagram of a variation of the mark image;
FIG. 6E is a diagram of a variation of the mark image;
FIG. 6F is a diagram of a variation of the mark image.

FIG. 9 is a diagram of a display example of the superimposed image;

FIG. 10A is a diagram of a border of a detected obstacle;

FIG. 10B is a diagram of a display example of the superimposed image;

FIG. 13 is a diagram of a display example of the superimposed image;

FIG. 14A is a diagram of a display example of the superimposed image;

FIG. 14B is a diagram of a display example of the superimposed image;

FIG. 15A is a diagram of a display example of the superimposed image;

FIG. 15B is a diagram of a display example of the superimposed image;

FIG. 16 is a diagram of a display example of the superimposed image;

FIG. 17 is a diagram of a display example of the superimposed image;

DESCRIPTION OF EMBODIMENTS

An embodiment of the present disclosure will hereinafter be described with reference to the drawings. The present disclosure is not limited to the embodiment described below and may be carried out according to various modes.

[Description of an Onboard Display System Configuration]

Figure 1:
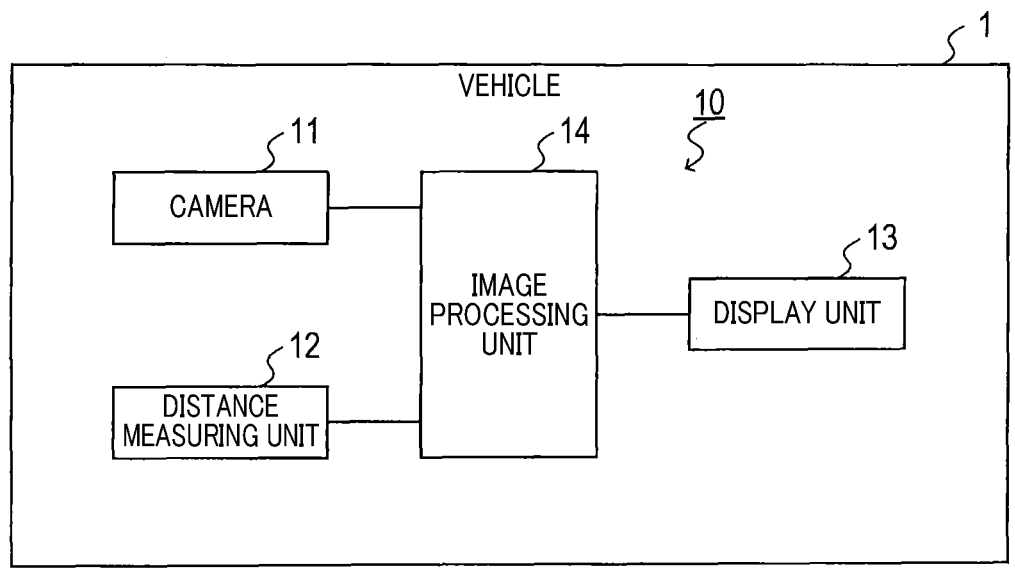
FIG. 1 is a block diagram of an overall configuration of an onboard display system.

A configuration of an onboard display system 10 according to the embodiment will be described with reference to FIG. 1. The onboard display system 10 is a system that is mounted in a vehicle 1 and assists in driving by displaying an image that is generated based on an image captured by a camera. As shown in an example in FIG. 1, the onboard display system 10 includes an image processing unit 14, a camera 11, a distance measuring unit 12, and a display unit 13. The camera 11 is connected to the image processing unit 14.

The camera 11 is an imaging apparatus that is set so as to face the periphery, such as ahead, to the side, or to the rear, of the vehicle 1. The camera 11 is configured to capture an image of a peripheral area of the vehicle 1, and output data of an image (also referred to, hereafter, as a captured image) that expresses the image that has been captured to the image processing unit 14.

The distance measuring unit 12 is a sensor that is configured to acquire information by scanning the area imaged by the camera 11. The information indicates the distance between an obstacle (such as another vehicle, a pedestrian, or a wall or a column of a building) that is present in the scanned area and the vehicle 1, and the direction of the obstacle when viewed from the vehicle 1. For example, the distance measuring unit 12 is realized by an ultrasonic sonar, a millimeter-wave radar, a laser radar, a stereo camera, a monocular camera, a periphery monitoring camera, or the like. The position, the shape of a border, the tilt of a face, and an approximate width of the obstacle can be recognized from the measurement results obtained by the distance measuring unit 12.

The display unit 13 is a display that is configured to display the image information provided by the image processing unit 14. For example, the display unit 13 is provided in a location that is easily visible to a driver of the vehicle 1, such as in an instrument panel of the vehicle 1.

The image processing unit 14 is an information processing apparatus that is mainly configured by a central processing unit (CPU), a random access memory (RAM), a read-only memory (ROM), a semiconductor memory such as a flash memory, an input/output interface, and the like (not shown). For example, the image processing unit 14 is realized by a microcontroller in which functions of a computer system are consolidated. The functions of the image processing unit 14 are actualized by the CPU running a program that is stored in a non-transitory tangible storage medium such as the ROM or the semiconductor memory. The image processing unit 14 may be configured by a single or a plurality of microcontrollers. The method for actualizing the functions of the image processing unit 14 is not limited to software. Some or all of the functions may be actualized through use of hardware combining logic circuits, analog circuits, and the like.

The image processing unit 14 performs a distance measurement process and an obstacle display process based on the above-described program. A detailed description of these processes will be given hereafter.

[Description of the Distance Measurement Process]

Figure 2:
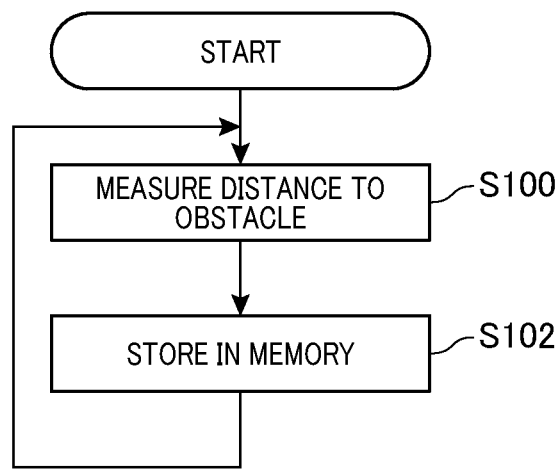
FIG. 2 is a flowchart of the steps in a distance measurement process.

The steps in the distance measurement process performed by the image processing unit 14 will be described with reference to a flowchart in FIG. 2. The distance measurement process is repeatedly performed at a predetermined control cycle during operation of the onboard display system 10.

At step S100, the image processing unit 14 measures the distance to an obstacle that is present in the periphery of the vehicle 1 using the distance measuring unit 12 and acquires positional information related to the obstacle. Specifically, the image processing unit 14 continuously scans the periphery of the vehicle 1 using detection waves of a radar, a sonar, or the like that configures the distance measuring unit 12, and receives reflected waves from the obstacle. The image processing unit 14 thereby acquires the positional information that indicates a distribution of the distance to an obstacle present in the scanned area. Alternatively, the positional information that indicates a distribution of the distance to an obstacle may be acquired through use of a known image recognition technology in which the distance to an object is recognized based on an image that is captured by a stereo camera, a monocular camera, a periphery monitoring camera, or the like.

At step S102, the image processing unit 14 stores the positional information acquired at step S100, that is, the information that indicates a distribution of the distance between the vehicle 1 and an obstacle in the memory within the image processing unit 14. After step S102, the image processing unit 14 returns the process to step S100.

[Description of the Obstacle Display Process]

The steps in the obstacle display process performed by the image processing unit 14 will be described with reference to a flowchart in FIG. 3. The obstacle display process is repeatedly performed at a predetermined control cycle during operation of the onboard display system 10, concurrently with the above-described distance measurement process.

At step S200, the image processing unit 14 acquires the latest captured image amounting to a single frame from the camera 11. At step S202, the image processing unit 14 performs a coordinate transformation on the coordinates of the pixels that configure the captured image acquired at step S200 using a known technique for bird's-eye-view conversion, and thereby converts the captured image of the camera 11 to a bird's-eye-view image that simulates a state of overlooking from a viewpoint set above the vehicle 1.

At step S204, the image processing unit 14 reads the latest positional information acquired through the above-described distance measurement process (see FIG. 2) from the memory. At step S206, the image processing unit 14 generates a mark image based on the positional information read at step S204 and the shape of the obstacle appearing in the bird's-eye-view image generated at step S202.

The mark image is a pattern used to indicate the obstacle that is present in the bird's-eye-view image. Specific properties of the mark image generated at this time will be described hereafter. At step S208, the image processing unit 14 generates a superimposed image in which the mark image generated at step S206 is superimposed onto a position that corresponds to the obstacle that appears in the bird's-eye-view image generated at step S202. The image processing unit 14 then displays the generated superimposed image in the display unit 13.

Here, the image processing unit 14 is configured to generate the superimposed image by changing the properties of the mark image to be superimposed onto the image of the obstacle, based on the state, such as the shape, tilt, position, and color, of the obstacle in the captured image captured by the camera 11 and identified by the distance measuring unit 12. For example, the properties of the mark image herein includes the shape, size, tilt, flashing, color, concentration, and transparency of the pattern. Hereafter, specific application examples of the mark image to be superimposed onto the image of the obstacle will be described with reference to FIG. 4 to FIG. 20.

FIG. 4: Application Example 1

Figure 4A:
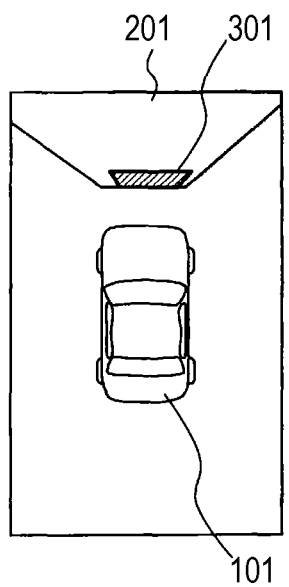
FIG. 4A is a diagram of a display example of a superimposed image.
Figure 4B:
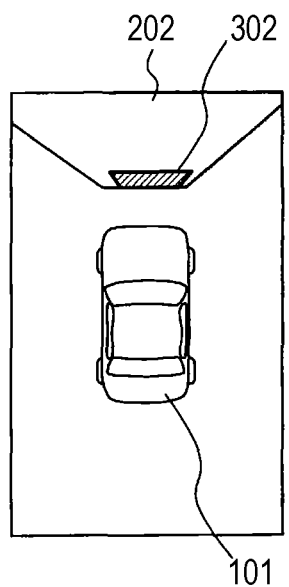
FIG. 4B is a diagram of a display example of the superimposed image.
Figure 4C:
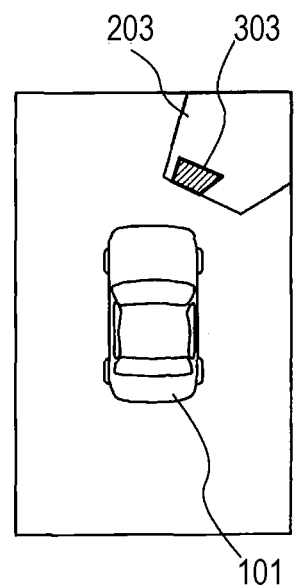
FIG. 4C is a diagram of a display example of the superimposed image.

FIG. 4A, FIG. 4B, and FIG. 4C are examples of the superimposed image displayed in the display unit 13. A vehicle image 101 that is a virtual image showing an external appearance of the vehicle 1 (that is, an own vehicle) is arranged in the superimposed images. Hereafter, the vehicle image 101 is presumed to be arranged in a similar manner in the superimposed images described in other application examples. The vehicle image 101 is inserted by the image processing unit 14 when the captured image captured by the camera 11 undergoes the bird's-eye-view conversion. In addition, the mark image that is the pattern that indicates the obstacle appearing in the bird's-eye-view image is inserted in the superimposed image by the image processing unit 14.

In a case in FIG. 4A, a state in which an image 201 of a narrow, elongated, columnar obstacle appears on a front side of the vehicle image 101 is assumed. In the case in FIG. 4A, the image processing unit 14 generates a mark image 301 that is composed of a plate-shaped pattern that has a width similar to the width of the obstacle image 201. The image processing unit 14 then generates the superimposed image by superimposing the mark image 301 to coincide with the position of the obstacle image 201 in the bird's-eye-view image.

In a case in FIG. 4B, a state in which an image 202 of a wall-like obstacle that has a width similar to that of the vehicle 1 appears on the front side of the vehicle image 101 is assumed. In the case in FIG. 4B, the image processing unit 14 generates a mark image 302 that is composed of a plate-shaped pattern that has a width that is wider than that in the case in FIG. 4A, based on the width of the obstacle appearing in the bird's-eye-view image. The image processing unit 14 then generates the superimposed image by superimposing the mark image 302 to coincide with the position of the obstacle image 202 in the bird's-eye-view image.

In a case in FIG. 4C, a state in which an image 203 of a wall-like obstacle that opposes the vehicle image 101 in a state in which a face is tilted in relation to a front direction of the vehicle image 101 appears diagonally to the front of the vehicle image 101 is assumed. In the case in FIG. 4C, the image processing unit 14 generates a mark image 303 that is composed of a pattern in which a plate-shaped face is tilted to match the tilt of the obstacle image 203 in relation to the front direction of the vehicle image 101. The image processing unit 14 then generates the superimposed image by superimposing the mark image 303 to coincide with the position of the obstacle image 203 in the bird's-eye-view image.

In the cases in FIG. 4A, FIG. 4B, and FIG. 4C, the image processing unit 14 is configured to be capable of changing the orientation of the mark image composed of the plate-shaped pattern, based on the tilt in a road-surface direction of the section at which each of the obstacles 201, 202, and 203 faces the vehicle 1. Specifically, the image processing unit 14 recognizes the tilt in the road-surface direction of the section at which each of the obstacles 201, 202, and 203 faces the vehicle 1 based on the shape of the border of each of the obstacles 201, 202, and 203 indicated by the positional information acquired by the distance measuring unit 12. The image processing unit 14 then generates the mark images 301, 302, and 303 that are each composed of a geometric pattern that has the same tilt as the tilt of the respective obstacles 201, 202, and 203 on the coordinate system of the bird's-eye-view image. The image processing unit 14 superimposes the mark images onto the images of the obstacles 201, 202, and 203.

FIG. 5: Application Example 2

The image processing unit 14 may be configured to periodically flash the mark image that is displayed so as to overlap the obstacle image. In addition, as shown in examples in FIG. 5A, FIG. 5B, and FIG. 5C, the length of a cycle at which a mark image 304 is flashed may be changed based on the length of the distance between the vehicle 1 and an obstacle 204. As a result, the driver can accurately ascertain the distance to the obstacle.

Figure 5A:
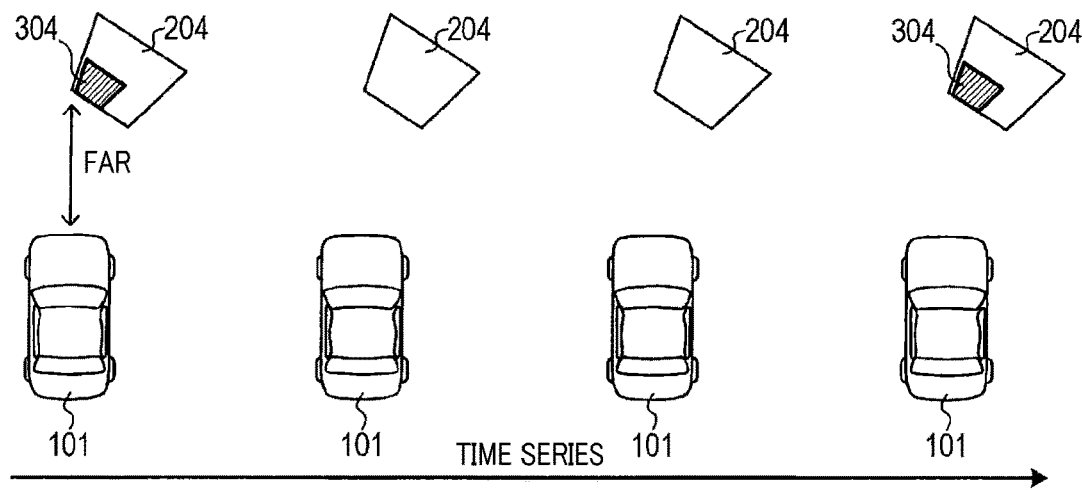
FIG. 5A is a diagram of transitions in the superimposed image in time-series.

A case in FIG. 5A is a time series showing the transitions over time in the superimposed image that is displayed by the image processing unit 14 in a state in which the distance between the vehicle 1 and the obstacle is relatively far. In the case in FIG. 5A, the image processing unit 14 displays the superimposed image in which the mark image 304 that is superimposed onto the obstacle image 204 is flashed at a relatively long cycle.

Figure 5B:
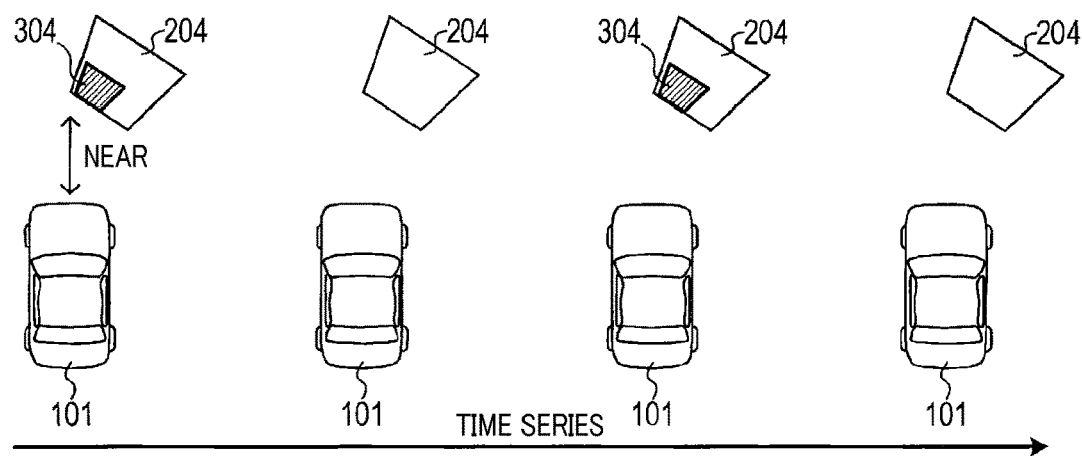
FIG. 5B is a diagram of transitions in the superimposed image in time-series.

A case in FIG. 5B is a time series showing the transitions over time in the superimposed image that is displayed by the image processing unit 14 in a state in which the distance between the vehicle 1 and the obstacle is relatively near (that is, nearer than that in the case in FIG. 5A). In the case in FIG. 5B, the image processing unit 14 displays the superimposed image in which the mark image 304 that is superimposed onto the obstacle image 204 is flashed at a cycle that is relatively shorter than that in the case in FIG. 5A.

Figure 5C:
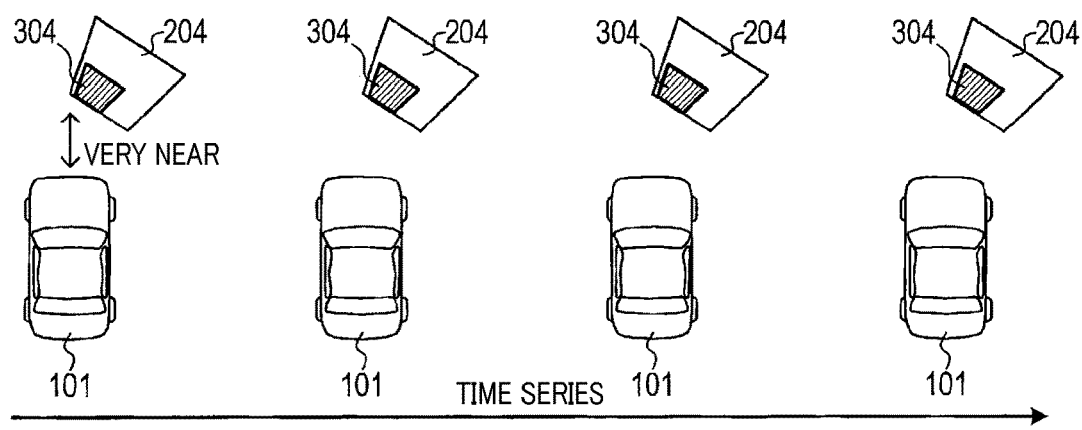
FIG. 5C is a diagram of transitions in the superimposed image in time-series.

A case in FIG. 5C is a time series showing the transitions over time in the superimposed image that is displayed by the image processing unit 14 in a state in which the distance between the vehicle 1 and the obstacle is very near (that is, even nearer than that in the case in FIG. 5B). In the case in FIG. 5C, the image processing unit 14 displays the superimposed image in which the mark image 304 that is superimposed onto the obstacle image 204 is continuously displayed or flashed at a cycle that is even shorter than that in the case in FIG. 5B.

FIG. 6: Application Example 3

As shown in examples in FIG. 6A, FIG. 6B, FIG. 6C, FIG. 6D, FIG. 6E, and FIG. 6F, the image processing unit 14 may be configured to superimpose a mark image that may include a figure comes in a variety of shapes, a symbol, an icon, or character information onto an image of an obstacle.

A case in FIG. 6A is an example of a superimposed image in which a mark image 305 that is composed of a plate-shaped pattern is superimposed along the face of an obstacle image 205. A case in FIG. 6B is an example of a superimposed image in which a mark image 306 that is composed of a polygonal-line-shaped pattern is superimposed along the face of the obstacle image 205. A case in FIG. 6C is an example of a superimposed image in which a mark image 307 that is composed of a wavy-line-shaped pattern is superimposed along the face of the obstacle image 205.

A case in FIG. 6D is an example of a superimposed image in which a mark image 308 that is composed of a dot-sequence-shaped pattern is superimposed along the face of the obstacle image. A case in FIG. 6E is an example of a superimposed image in which a mark image 309 that is composed of an icon that includes a symbol that prompts caution is superimposed along the face of the obstacle image 205. A case in FIG. 6F is an example of a superimposed image in which a mark image 310 that is composed of character information that indicates the distance to the obstacle is superimposed along the face of the obstacle image 205.

Figure 7:
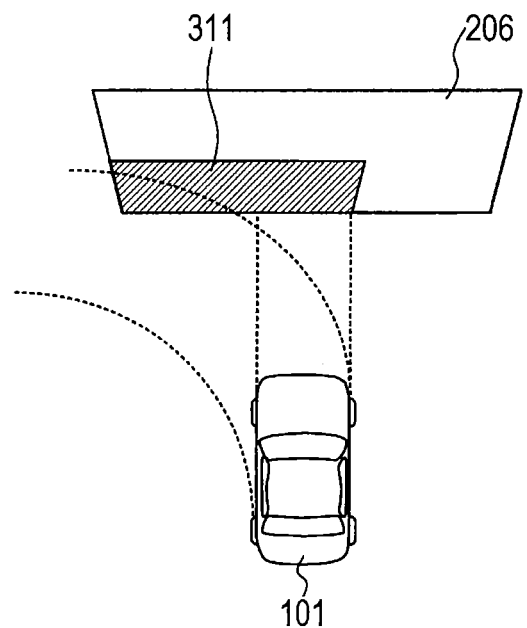
FIG. 7 is a diagram of a display example of the superimposed image.

FIG. 7: Application Example 4

The image processing unit 14 may be configured to arrange a mark image for an obstacle that corresponds to a course on which the vehicle 1 is predicted to advance or an area obtained by the vehicle width being extended in frontward and rearward directions of the vehicle length. In this case, the mark image may not be displayed in other areas even when an obstacle is detected. Specifically, the image processing unit 14 predicts the course of the vehicle 1 by acquiring vehicle information that indicates a steering state of the vehicle 1 and the like. The image processing unit 14 then identifies the area of the predicted course or the area in the frontward and rearward directions of the vehicle length in the bird's-eye-view image based on information, such as the vehicle width and the vehicle length of the vehicle 1, registered in advance.

A case in FIG. 7 is an example of a superimposed image that is displayed in a state in which a course on which the vehicle 1 turns in a leftward direction is predicted. In the case in FIG. 7, in an obstacle image 206, a mark image 311 is arranged along an area in a lateral direction that corresponds to an area of the locus of the predicted course on which the vehicle 1 turns in the leftward direction and an area obtained by the vehicle width being projected in the frontward direction. As a result, an obstacle in an area with which the vehicle 1 is likely to come into contact can be presented in a manner that is easily understandable to the driver.

Figure 8:
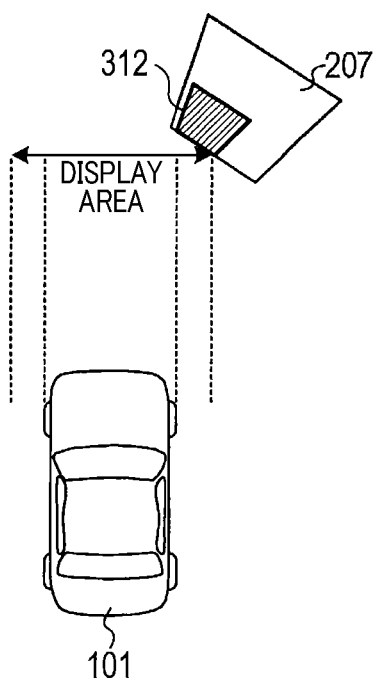
FIG. 8 is a diagram of a display example of the superimposed image.

FIG. 8: Application Example 5

The image processing unit 14 may be configured to arrange a mark image for an obstacle that corresponds to an area with reference to the vehicle width of the vehicle 1, taking into consideration the likelihood of contact between the vehicle 1 and the obstacle. In this case, as shown in an example in FIG. 8, the configuration may be such that the mark image is arranged over an area that is slightly wider than the vehicle width of the vehicle 1.

The case in FIG. 8 is an example of a superimposed image that is displayed in a state in which an obstacle is present diagonally to the front of the vehicle 1. In the case in FIG. 8, in an obstacle image 207, a mark image 312 is arranged in a section that corresponds to a display area that is obtained by an area obtained through projection of the vehicle width of the vehicle 1 in the frontward direction being enlarged by a predetermined distance to the left and right. As a result, an obstacle in an area with which the vehicle 1 is likely to come into contact can be presented in a manner that is easily understandable to the driver.

FIG. 9: Application Example 6

The image processing unit 14 may be configured to arrange a mark image related to the obstacle in an area that is wider than a width of a borderline (also referred to, hereafter, as a detection line) that indicates a shape of an obstacle that is detected by the radar or the sonar of the distance measuring unit 12. Specifically, the image processing unit 14 identifies the width of the detection line of the obstacle that is indicated by the positional information acquired by the distance measuring unit 12. The image processing unit 14 then identifies the area over which the mark image is arranged with reference to the width of the detection line.

A case in FIG. 9 is an example of a superimposed image that is displayed in a state in which an obstacle is present in front of the vehicle. In the case in FIG. 9, a mark image 313 is arranged in a section of an obstacle image 208 that corresponds to a display area that is obtained by the width of the detection line that has actually been detected being extended by a predetermined distance to the left and right. As a result, the scale of the obstacle can be accurately presented to the driver even in cases in which the width of the actual obstacle is greater than the width of the detection line.

FIG. 10: Application Example 7

The image processing unit 14 may be configured to recognize a border of an obstacle, which has been detected by the radar or the sonar of the distance measuring unit 12, from the bird's-eye-view image using image recognition. The image processing unit 14 may then arrange a mark image related to the obstacle along the recognized border.

Specifically, as shown in an example in FIG. 10A, the image processing unit 14 extracts a feature quantity, such as an edge, from an image area surrounding the detection line in an obstacle image 209 appearing in the bird's-eye-view image. The image processing unit 14 then detects a border of the obstacle in a vertical direction based on the extracted feature quantities. In addition, as shown in an example in FIG. 10B, the image processing unit 14 superimposes a mark image 314 that has a width along the borders of the obstacle image 209 onto the obstacle image 209. As a result, the scale of the obstacle can be accurately presented to the driver even in cases in which the width of the actual obstacle is greater than the width of the detection line.

FIG. 11: Application Example 8

The image processing unit 14 may be configured to change the properties (such as the shape, size, color, and transmittance) of the mark image to be superimposed onto an image of an obstacle based on the farness/nearness of the distance between the vehicle 1 and the obstacle. As a result, the driver can accurately ascertain the distance to the obstacle.

Figure 11A:
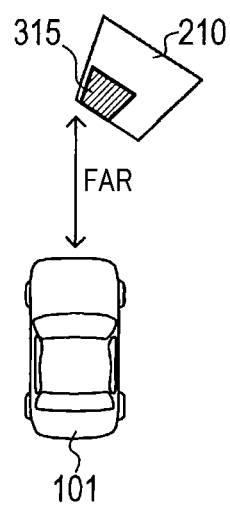
FIG. 11A is a diagram of a display example of the superimposed image at a far distance.

A case in FIG. 11A is an example of a superimposed image that is displayed by the image processing unit 14 in a state in which the distance between the vehicle 1 and the obstacle is relatively far. In the case in FIG. 11A, the image processing unit 14 displays a superimposed image in which a mark image 315 that has a relatively small shape is superimposed onto an obstacle image 210.

Figure 11B:
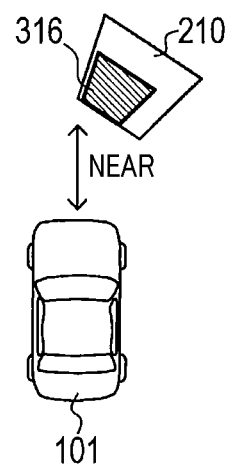
FIG. 11B is a diagram of a display example of the superimposed image at a near distance.

A case in FIG. 11B is an example of a superimposed image that is displayed by the image processing unit 14 in a state in which the distance between the vehicle 1 and the obstacle is relatively near (that is, nearer than that in the case in FIG. 11A). In the case in FIG. 11B, the image processing unit 14 displays a superimposed image in which a mark image 316 that has a shape that is relatively larger than that in the case in FIG. 11A is superimposed onto the obstacle image 210. At this time, the image processing unit 14 may change the color and transmittance of the mark image 316 to a more emphatic mode than the color and transmittance of the mark image 315 in FIG. 11A.

Figure 11C:
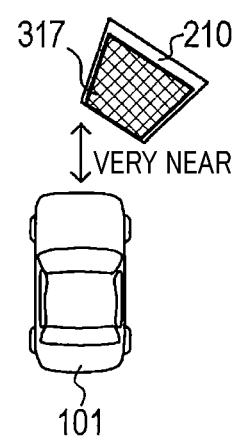
FIG. 11C is a diagram of a display example of the superimposed image at a very near distance.

A case in FIG. 11C is an example of a superimposed image that is displayed by the image processing unit 14 in a state in which the distance between the vehicle 1 and the obstacle is very near (that is, even nearer than that in the case in FIG. 11B). In the case in FIG. 11C, the image processing unit 14 displays a superimposed image in which a mark image 317 that has a shape that is even larger than that in the case in FIG. 11B is superimposed onto the obstacle image 210. At this time, the image processing unit 14 may change the color and transmittance of the mark image 317 to a more emphatic mode than the color and transmittance of the mark image 316 in FIG. 11B.

Figure 12:
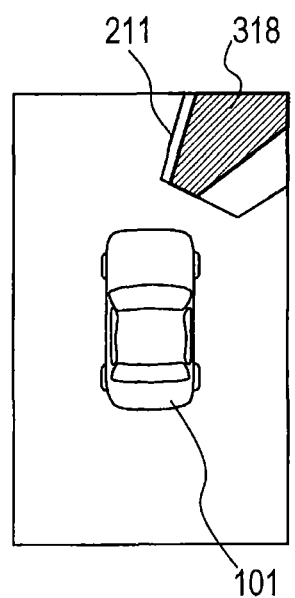
FIG. 12 is a diagram of a display example of the superimposed image.

FIG. 12: Application Example 9

The image processing unit 14 may be configured to draw the mark image to be superimposed onto an image of an obstacle so as to be extended to an outer edge of a display area of the superimposed image in a direction corresponding to an upper side of the obstacle. Specifically, as shown in an example in FIG. 12, the image processing unit 14 draws a mark image 318, which is arranged on an obstacle image 211, so as to be extended to an upper end portion of the display area of the superimposed image in a direction corresponding to an upper side of the obstacle image 211. As a result, the mark image related to an obstacle can be presented to the driver in a mode that emphasizes the height of the obstacle.

FIG. 13: Application Example 10

The image processing unit 14 may be configured to extend the shape of the mark image to be superimposed onto an image of an obstacle in the bird's-eye-view image in a radiating manner, taking into consideration distortion (such as the image being extended in a radiating manner as the image becomes farther from the center) in the image that occurs when the captured image captured by the camera 11 is converted to the bird's-eye-view image. Specifically, as shown in an example in FIG. 13, the image processing unit 14 draws a mark image 318 to be superimposed onto an obstacle image 211 in a shape that is extended in a radiating manner with an image position in the bird's-eye-view image corresponding to the position of the camera 11 as the center. As a result, discomfort experienced by the driver can be reduced.

FIG. 14: Application Example 11

The image processing unit 14 may be configured to draw the mark image to be superimposed onto an image of an obstacle in a mode in which a lower end side of the obstacle is emphasized. Specifically, as shown in examples in FIG. 14A and FIG. 14B, the image processing unit 14 emphasizes the lower end side of an obstacle image 213 by drawing each of mark images 320 and 321 so as to change the color and concentration of the respective patterns composing the mark images 320 and 321 continuously or in steps from the upper end side to the lower end side of the obstacle image 213. As a result, the mark image can be displayed in a mode in which the section on the lower side of the obstacle that is likely to come into contact with the vehicle 1 is emphasized.

FIG. 15: Application Example 12

The image processing unit 14 may be configured to recognize the color of the obstacle from the captured image and draw the mark image using a color that corresponds to a complementary color of the recognized color of the obstacle. Specifically, as shown in examples in FIG. 15A and FIG. 15B, mark images 322 and 323 that are each composed of a pattern that has a relationship in which the color is complementary to the color of the respective obstacle image 214 or 215 are superimposed onto the obstacle images 214 and 215. As a result, the obstacle image and the mark image can be made to complement each other, and visibility by the driver can be improved.

FIG. 16: Application Example 13

When the obstacle detected by the distance measuring unit 12 is presumed to be a sloped surface, the image processing unit 14 may be configured to also arrange the mark image in an area further towards the vehicle 1 than the detection line that indicates the border of the detected obstacle.

For example, when the radar or the sonar of the distance measuring unit 12 detects a sloped surface, such as an upward slope, an undetected sloped surface is likely to be continuing towards the vehicle 1 in an area below a lower limit of the detection area of the radar or the sonar in the vertical direction. Therefore, as shown in an example in FIG. 16, the image processing unit 14 arranges a mark image 324 in an area of an image 216 of a sloped surface that is detected as the obstacle, the area including an area further towards the vehicle image 101 than the actual detection line. As a result, the attention of the driver can be drawn to the section of the sloped surface that is not detected by the radar or the sonar of the distance measuring unit 12.

FIG. 17: Application Example 14

The image processing unit 14 may be configured to draw the mark image to be superimposed onto an image of an obstacle in a mode in which an area that is actually detected by the distance measuring unit 12 is given more emphasis than other areas. Specifically, as shown in an example in FIG. 17, the image processing unit 14 displays a mark image 325A that is composed of a plate-shaped pattern on an obstacle image 217, and displays an emphasized image 325B in an image area corresponding to the area that is detected by the radar or the sonar of the distance measuring unit 12. The emphasized image 325B is assumed to be composed of a pattern that is drawn using a more emphatic color, concentration, or transmittance than that of the mark image 325A. As a result, the attention of the driver can be drawn to the border of the obstacle.

FIG. 18: Application Example 15

The image processing unit 14 may be configured to display lines (referred to, hereafter, as grid lines) in the form of squares that serve as an indicator of the distance between the vehicle 1 and the obstacle in the superimposed image, based on the farness/nearness of the distance between the vehicle 1 and the obstacle. In addition, the size of the squares formed by the grid lines may be variable, based on the farness/nearness of the distance between the vehicle 1 and the obstacle. As a result, the driver can accurately ascertain the distance to the obstacle.

Figure 18A:
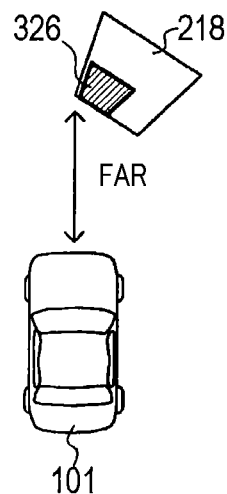
FIG. 18A is a diagram of a display example of the superimposed image at a far distance.

A case in FIG. 18A is an example of a superimposed image that is displayed by the image processing unit 14 in a state in which the distance between the vehicle 1 and the obstacle is relatively far. In the case in FIG. 18A, the image processing unit 14 displays a superimposed image in which a mark image 315 is superimposed onto an obstacle image 218. However, at this distance, the grid lines that serve as the indicator of the distance between the vehicle 1 and the obstacle are not displayed.

Figure 18B:
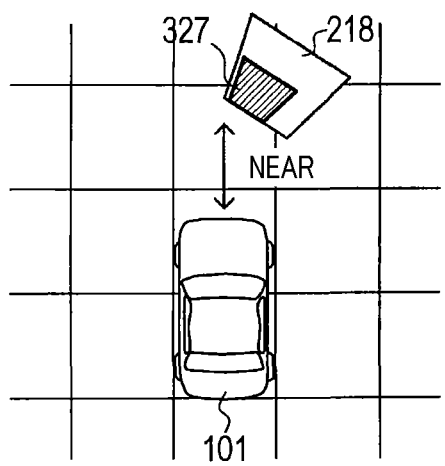
FIG. 18B is a diagram of a display example of the superimposed image at a near distance.

A case in FIG. 18B is an example of a superimposed image that is displayed by the image processing unit 14 in a state in which the distance between the vehicle 1 and the obstacle is relatively near (that is, nearer than that in the case in FIG. 18A). In the case in FIG. 18B, the image processing unit 14 displays a superimposed image in which a mark image 327 is superimposed onto the obstacle image 218, and grid lines composed of relatively large squares are drawn in the periphery of the vehicle image 101 and the obstacle image 218.

Figure 18C:
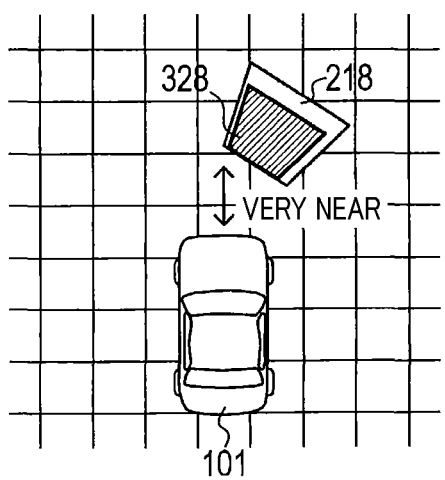
FIG. 18C is a diagram of a display example of the superimposed image at a very near distance.

A case in FIG. 18C is an example of a superimposed image that is displayed by the image processing unit 14 in a state in which the distance between the vehicle 1 and the obstacle is very near (that is, even nearer than that in the case in FIG. 18B). In the case in FIG. 18C, the image processing unit 14 displays a superimposed image in which a mark image 328 is superimposed onto the obstacle image 218, and grid lines composed of squares that are smaller than that in the case in FIG. 18B are drawn in the periphery of the vehicle image 101 and the obstacle image 218.

FIG. 19: Application Example 16

When the obstacle detected by the distance measuring unit 12 is presumed to be a vehicle, the image processing unit 14 may be configured to display, in a superimposing manner, a mark image that is composed of an icon that represents a vehicle so as to match the orientation and size of the vehicle detected as the obstacle.

Figure 19A:
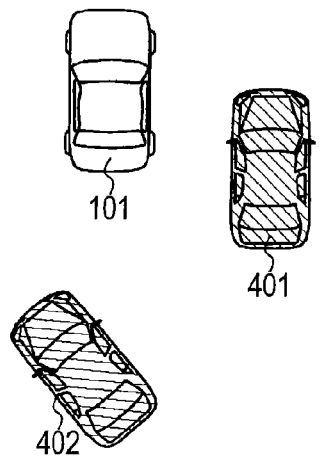
FIG. 19A is a diagram in which an image of an own vehicle is arranged in an original image including peripheral vehicles.
Figure 19B:
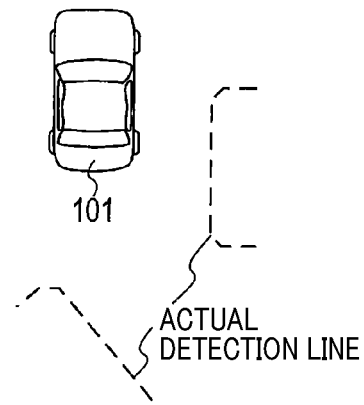
FIG. 19B is a diagram of the borderlines of the peripheral vehicles that are actually detected.

A case in FIG. 19A shows a bird's-eye-view image generated from the captured image captured by the camera 11 in a state in which images 401 and 402 of two other vehicles appear in the periphery of the vehicle image 101 that corresponds to the vehicle 1. FIG. 19B shows the detection lines that indicate the borders of the other vehicles actually detected by the distance measuring unit 12 in the state given as an example in FIG. 19A.

Figure 19C:
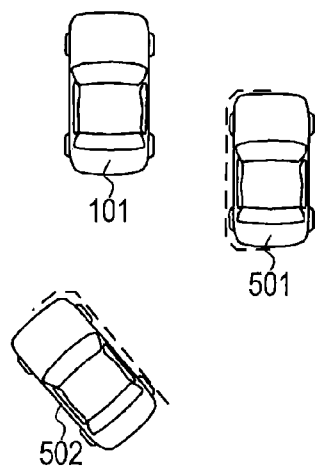
FIG. 19C is a diagram in which icons indicating vehicles are arranged to coincide with detection lines.

As shown in an example in FIG. 19C, the image processing unit 14 generates mark images 501 and 502 that are each composed of the icon that represents a vehicle, along the shape and tilt of the detection lines. The mark images 501 and 502 generated in the case in FIG. 19C are presumed to be drawn using a non-transparent color. Then, as shown in an example in FIG. 19D, the image processing unit 14 displays a superimposed image in which the generated mark images 501 and 502 are respectively superimposed onto the images 401 and 402 of the other vehicles.

Figure 19D:
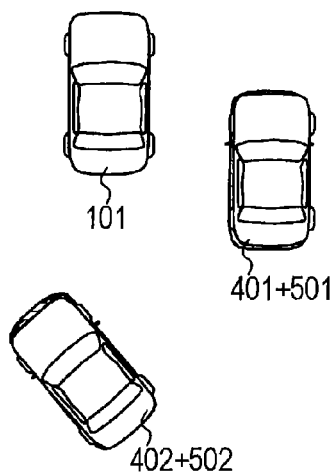
FIG. 19D is a diagram in which the icons indicating vehicles are superimposed on the original images of the peripheral vehicles.
Figure 19E:
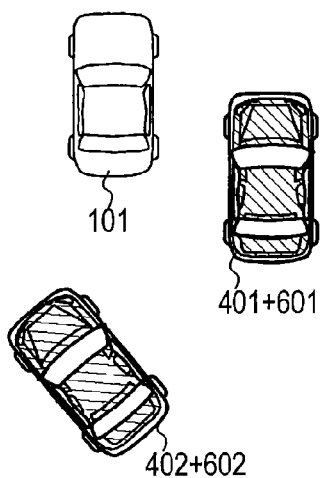
FIG. 19E is a diagram in which transparent-colored icons indicating vehicles are superimposed on the original images of the peripheral vehicles.

Alternatively, as shown in an example in FIG. 19D, the image processing unit 14 may be configured to superimpose mark images 601 and 602 onto the images 401 and 402 of the other vehicles. In the mark images 601 and 602, the pattern of the vehicle is indicated only by an outline and the interior is transparent.

Figure 20:
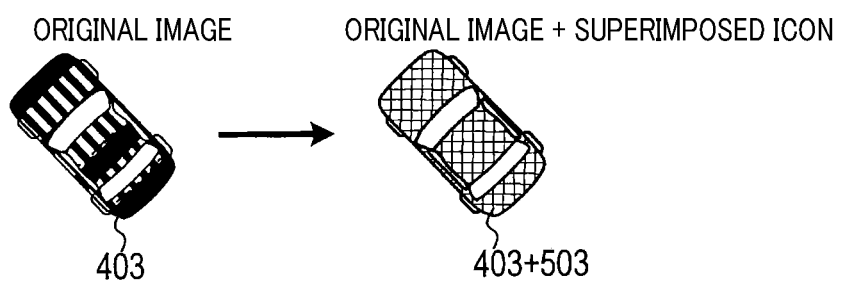
FIG. 20 is a diagram in which an icon indicating a vehicle is superimposed on an original image of a peripheral vehicle.

FIG. 20: Application Example 17

When drawing a mark image that is composed of an icon that represents a vehicle, the image processing unit 14 may be configured to use a single representative color that is acquired from an original image of another vehicle onto which the mark image is to be superimposed. Specifically, as shown in an example in FIG. 20, the image processing unit 14 extracts a specific color from an image 403 of another vehicle that appears in the bird's-eye-view image and displays a mark image 503 that is drawn using the extracted color so as to overlap the image 403 of the other vehicle. As a result, even in cases in which a complex pattern is drawn on another vehicle that is detected as the obstacle or cases in which a complex pattern is formed as a result of light passing through the gratings in a parking structure or the like, the mark image can be displayed in a simple and easy-to-see mode.

Effects

The following effects are achieved by the onboard display system according to the embodiment.

Based on the shape, such as the tilt and size, of an obstacle that is detected in the periphery of the vehicle 1, the properties, such as the orientation and shape, of the mark image that is the pattern indicating the obstacle can be freely changed. In addition, a display mode, such as the size, color, and flashing, of the mark image can be freely changed based on the distance to the obstacle. As a result of the driver of the vehicle viewing the superimposed image in which the mark image is superimposed onto the image of the obstacle in this way, the driver can easily ascertain the state of the obstacle.

Correspondence to the Configuration According to the Embodiment

The image processing unit 14 corresponds to an example of a display control apparatus. The processes at steps S200 and S202 performed by the image processing unit 14 corresponds to an example of a process as an image acquiring unit. The process at step S206 performed by the image processing unit 14 corresponds to an example of a process as an obstacle identifying unit and a control unit.

Variation Example

A function provided by a single constituent element according to the above-described embodiments may be divided among a plurality of constituent elements. Functions provided by a plurality of constituent elements may be provided by a single constituent element. In addition, a part of a configuration according to the above-described embodiments may be omitted. Furthermore, at least a part of a configuration according to an above-described embodiment may be added to or replace a configuration according to another of the above-described embodiments. Any mode included in the technical concept specified by the wordings of the claims is an embodiment of the present disclosure.

For example, in the application example 1 (see FIG. 4) described above, a case in which the shape, such as the tilt and width, of the mark image to be superimposed onto the image of an obstacle is made variable based on the orientation and width of the obstacle is described. Furthermore, the configuration may be such that the properties, such as the color and pattern, of the mark image are changed based on the tilt of the obstacle.

In addition, according to the above-described embodiment, a case in which, upon conversion of a captured image captured by the camera 11 into a bird's-eye-view image, the mark image is superimposed onto the image of an obstacle in the converted bird's-eye-view image is described. In addition, the bird's-eye-view image, the mark image may be superimposed on the captured image captured by the camera 11 itself. Alternatively, the mark image may be superimposed onto an image obtained by conversion to an image of a perspective other than the bird's-eye-view image.

The present disclosure can also be actualized in various modes, such as a program for enabling a computer to function as the above-described image processing unit 14, and a non-transitory tangible recording medium such as a semiconductor memory, in which the program is recorded.

The invention claimed is:

1. A display control apparatus that displays an image on a display apparatus that is provided inside a vehicle, the image being generated based on an image capturing a predetermined area in a periphery of the vehicle by a camera that is mounted in the vehicle, the display control apparatus comprising processing circuitry configured to:
   acquire a peripheral image that is the image based on the image captured by the camera;
   identify at least one of a shape, a tilt, a position, and a color of an obstacle that is identified from an area appearing in the peripheral image acquired by the processing circuitry;
   generate a superimposed image in which a mark image that is generated as a pattern indicating the obstacle identified by the processing circuitry is superimposed onto a position corresponding to the obstacle in the peripheral image, and display the generated superimposed image on the display apparatus;
   acquire, as the peripheral image, a bird's-eye-view image in which the image captured by the camera is changed to an image that is expressed by a bird's-eye-view;
   display the mark image so as to be superimposed onto the bird's-eye-view image; and
   variably change properties of the mark image based on a condition of at least one of the shape, the tilt, the position, or the color of the obstacle identified by the processing circuitry, wherein:
   the processing circuitry is configured to draw the mark image in a mode in which a lower end side of the obstacle is given more emphasis than an upper end side, by drawing the mark image so as to change the mark image continuously or in steps from the upper end side to the lower end side of the obstacle as depicted in the bird's eye image acquired as the peripheral image.

2. A display control apparatus that displays an image on a display apparatus that is provided inside a vehicle, the image being generated based on an image capturing a predetermined area in a periphery of the vehicle by a camera that is mounted in the vehicle, the display control apparatus comprising processing circuitry configured to:
   acquire a peripheral image that is the image based on the image captured by the camera;
   identify at least one of a shape, a tilt, a position, and a color of an obstacle that is identified from an area appearing in the peripheral image acquired by the processing circuitry;
   generate a superimposed image in which a mark image that is generated as a pattern indicating the obstacle identified by the processing circuitry is superimposed onto a position corresponding to the obstacle in the peripheral image, and display the generated superimposed image on the display apparatus;
   acquire, as the peripheral image, a bird's-eye-view image in which the image captured by the camera is changed to an image that is expressed by a bird's-eye-view;
   display the mark image so as to be superimposed onto the bird's-eye-view image; and
   variably change properties of the mark image based on a condition of at least one of the shape, the tilt, the position, or the color of the obstacle identified by the processing circuitry, wherein:
   the processing circuitry is configured to draw the mark image in a mode in which a lower end side of the obstacle is given more emphasis than an upper end side, by drawing the mark image so as to change at least one of a color, a concentration, and a transmittance of a pattern composing the mark image continuously or in steps from the upper end side to the lower end side of the obstacle as depicted in the bird's eye image acquired as the peripheral image.

* * * * *